US012790439B2

(12) United States Patent
Funahashi et al.

(10) Patent No.: US 12,790,439 B2
(45) Date of Patent: Nov. 10, 2026

(54) CROSSLINKED POLYARYLENE SULFIDE, COMPOSITION, AND METHOD FOR PRODUCING MOLDED ARTICLE

(71) Applicant: DIC Corporation, Tokyo (JP)

(72) Inventors: Chikara Funahashi, Ichihara (JP); Hideki Watanabe, Ichihara (JP); Takashi Furusawa, Ichihara (JP)

(73) Assignee: DIC Corporation, Tokyo (JP)

( * ) Notice: Subject to any disclaimer, the term of this patent is extended or adjusted under 35 U.S.C. 154(b) by 726 days.

(21) Appl. No.: 18/269,304

(22) PCT Filed: Aug. 26, 2021

(86) PCT No.: PCT/JP2021/031291
§ 371 (c)(1),
(2) Date: Jun. 23, 2023

(87) PCT Pub. No.: WO2022/137648
PCT Pub. Date: Jun. 30, 2022

(65) Prior Publication Data

US 2024/0059841 A1 Feb. 22, 2024

(30) Foreign Application Priority Data

Dec. 24, 2020 (JP) ................................ 2020-214821

(51) Int. Cl.

| | |
|---|---|
| ***C08G 75/0277*** | (2016.01) |
| ***B29B 9/12*** | (2006.01) |
| ***C08G 75/0259*** | (2016.01) |
| ***C08J 3/12*** | (2006.01) |
| ***C08J 3/24*** | (2006.01) |
| *B29B 9/04* | (2006.01) |
| *B29K 81/00* | (2006.01) |
| *B29K 105/04* | (2006.01) |
| *B29K 105/24* | (2006.01) |

(52) U.S. Cl.
CPC ............ *C08G 75/0277* (2013.01); *B29B 9/12* (2013.01); *C08G 75/0259* (2013.01); *C08J 3/12* (2013.01); *C08J 3/24* (2013.01); *B29B 9/04* (2013.01); *B29K 2081/00* (2013.01); *B29K 2105/04* (2013.01); *B29K 2105/24* (2013.01); *C08J 2381/02* (2013.01)

(58) Field of Classification Search
CPC .... C08G 3/12; C08G 75/0204; C08J 2381/02; C08L 81/02
See application file for complete search history.

(56) References Cited

U.S. PATENT DOCUMENTS

| | | | | |
|---|---|---|---|---|
| 3,354,129 A | | 11/1967 | Edmonds, Jr. et al. | |
| 3,592,783 A | * | 7/1971 | Edmonds | F16C 33/201 521/64 |
| 3,717,620 A | | 2/1973 | Rohlfing | |
| 3,793,256 A | | 2/1974 | Scoggin | |
| 2016/0244569 A1 | * | 8/2016 | Chiong | C08G 75/025 |

FOREIGN PATENT DOCUMENTS

| | | | |
|---|---|---|---|
| JP | S62-177027 A | | 8/1987 |
| JP | 04-248841 | * | 4/1992 |
| JP | H04-248841 A | | 9/1992 |

* cited by examiner

*Primary Examiner* — Margaret G Moore
(74) *Attorney, Agent, or Firm* — Troutman Pepper Locke LLP; James E. Armstrong, IV; Tanya Leavy

(57) ABSTRACT

An object of the present invention is to provide a method for producing a crosslinked polyarylene sulfide (PAS) that reduces a difference in melt viscosity among lots and has excellent quality stability. Further specifically, the present invention provides a method for producing a crosslinked PAS including steps of compression-molding an uncross-linked PAS in a powder form to obtain a compression-molded material, measuring a porosity of the compression-molded material, grinding the compression-molded product having a specific range of porosity to obtain a pulverized material, granulating the pulverized material to obtain a granulated material, and oxidatively crosslinking the granulated material obtained in the preceding step. Also provided are a method for producing a composition containing the crosslinked PAS, and a method for producing a molded article by melt-molding the composition.

15 Claims, No Drawings

CROSSLINKED POLYARYLENE SULFIDE, COMPOSITION, AND METHOD FOR PRODUCING MOLDED ARTICLE

TECHNICAL FIELD

The present invention relates to a method for producing a crosslinked polyarylene sulfide, a method for producing a composition containing the crosslinked polyarylene sulfide, and a method for producing a molded article by melt-molding the composition.

BACKGROUND ART

Among polyarylene sulfides (hereinafter referred to as PAS) typified by polyphenylene sulfides (hereinafter referred to as PPS) used in engineering plastics, and the like, a crosslinked PAS is used in which a granular PAS that is produced by solution polymerization is subjected to oxidative crosslinking until a melt flow rate (hereinafter referred to as MFR, which is measured at 316° C. under a load of 5 kg in a unit of g/10 minutes in accordance with ASTM D-1238-74) reaches a desired value. This oxidative crosslinking proceeds generally by heating a PAS in a solid phase state at a temperature equal to or lower than the melting point in an oxygen-containing atmosphere, or by heating a PAS in a molten state at a temperature equal to or higher than the melting point in an oxygen-containing atmosphere.

Examples of an oxidative crosslinking method include a method using a forced hot air circulation type drier (PTL 1), a method using a container-fixed heating mixer with a double spiral type agitator (PTL 2), a method using a fluidized bed (PTL 3), a method using a fluidized bed with a cyclone, and a method using a bag filter built-in fluidized bed (PTL 4).

The above methods handle a PAS in a powder form in common. This causes inhibition of heat transfer due to generation of a layer attached to an inner wall of a reactor, extension of crosslinking time, uneven properties of a product, a decrease in collection rate and productivity due to generation of dust during preparation or taking out, and deterioration of workability. A method for producing a crosslinked PAS in which a granulated material of uncrosslinked PAS that is obtained by compression and granulation of a powdered PAS and has a bulk density of 0.4 g/cm$^3$ or more is heated in an oxygen-containing atmosphere resulting in oxidative crosslinking (referred to as conventional method) is proposed (PTL 5).

CITATION LIST

Patent Literature

PTL 1: U.S. Pat. No. 3,354,129
PTL 2: U.S. Pat. No. 3,717,620
PTL 3: U.S. Pat. No. 3,793,256
PTL 4: Japanese Unexamined Patent Application Publication No. 62-177027
PTL 5: Japanese Unexamined Patent Application Publication No. 4-248841

SUMMARY OF INVENTION

Technical Problem

However, the conventional method makes a large difference in melt viscosity among lots, and obviously has room for improvement in quality stability.

An object of the present invention is to provide a method for producing a crosslinked PAS that reduces a difference in melt viscosity among lots and has excellent quality stability. Furthermore, another object of the present invention is to provide a method for producing a composition containing the crosslinked PAS, and a method for producing a molded article by melt-molding the composition.

Solution to Problem

The inventors of the present application have made extensive investigations. Since the conventional method is a method for oxidatively crosslinking an uncrosslinked granulated material that is adjusted such that, a bulk density is within a specific range, the inventors have found that variations in a space generated among particles during deposition largely varies depending on the particle shape of the granulated material regardless of the same bulk density, and as a result, a difference in melt viscosity among lots may be made. The inventors have diligently investigated to satisfy severer market needs, and as a result, revealed that taking the presence of closed cell in the uncrosslinked granulated material (flake) into account is useful. In this case, for a pore (void) present inside the compression-molded product, a porosity (void ratio) is measured by a measurement procedure such as an X-ray CT scanning method, and a granulated material prepared using a compression-molded product of a specific range is oxidatively crosslinked. This makes more homogeneous and stable crosslinking treatment possible. Thus, the inventors have found that a crosslinked PAS that reduces a difference in melt viscosity among lots and has excellent quality stability is obtained, and completed the present invention.

Specifically, the present invention provides a method for producing a crosslinked polyarylene sulfide including steps of: compression-molding an uncrosslinked polyarylene sulfide in a powder form to obtain a compression-molded material; measuring a porosity of the compression-molded material; grinding the compression-molded product having a specific range of porosity to obtain a pulverized material; granulating the pulverized material to obtain a granulated material; and oxidatively crosslinking the granulated material obtained in the preceding step.

Furthermore, the present invention provides a method for producing a resin composition including steps of: producing a crosslinked polyarylene sulfide by the production method; and melt-kneading the obtained crosslinked polyarylene sulfide with another component.

Furthermore, the present invention provides a method for producing a molded article including steps of: producing a resin composition by the production method; and melt-molding the obtained resin composition.

Advantageous Effects of Invention

The present invention can provide a method for producing crosslinked PAS that reduces a difference in melt viscosity among lots and has excellent quality stability. Furthermore, the present invention can provide a method for producing a composition containing the crosslinked PAS, and a method for producing a molded article by melt-molding the composition.

DESCRIPTION OF EMBODIMENTS

A method for producing a crosslinked polyarylene sulfide of the present invention includes steps of: compression-molding an uncrosslinked polyarylene sulfide in a powder form to obtain a compression-molded material; measuring a porosity of the compression-molded material; grinding the compression-molded product having a specific range of porosity to obtain a pulverized material; granulating the pulverized material to obtain a granulated material; and oxidatively crosslinking the granulated material obtained in the preceding step.

For example, the uncrosslinked PAS in a powder form is usually synthesized by a reaction of at least one type of polyhaloaromatic compound with at least one type of sulfide-forming agent in an organic polar solvent typified by N-methyl-2-pyrrolidone and the like under an appropriate polymerization condition.

The polyhaloaromatic compound used in the present invention is a halogenated aromatic compound having two or more halogen atoms directly bonded to an aromatic ring. Specific examples thereof include dihaloaromatic compounds such as p-diclorobenzene, o-diclorobenzene, m-diclorobenzene, trichlorobenzene, tetrachlorobenzene, dibromobenzene, diiodobenzene, tribromobenzene, dibromonaphthalene, triiodobenzene, diclorodiphenylbenzene, dibromodiphenylbenzene, dichlorobenzophenone, dibromobenzophenone, dichloro diphenyl ether, dibromo diphenyl ether, dichloro diphenyl sulfide, dibromo diphenyl sulfide, dichlorobiphenyl, dibromobiphenyl, and a mixture thereof. The compounds may be block-copolymerized. In particular, dihalogenated benzenes are preferable, and a compound containing 80% by mole or more of p-diclorobenzene is particularly preferable.

In order to increase the viscosity of polyarylene sulfide due to a branched structure, a polyhaloaromatic compound having 3 or more halogen substituents in the molecule may be used as a branching agent, as desired. Examples of such a polyhaloaromatic compound include 1,2,4-trichlorobenzene, 1,3,5-trichlorobenzene, and 1,4,6-trichlorolnaphthalene.

Furthermore, examples thereof include polyhaloaromatic compounds having active hydrogen-containing functional groups such as an amino group, a thiol group, and a hydroxyl group. Specific examples thereof include dihaloanilines such as 2,6-dichloroaniline, 2,5-dichloroaniline, 2,4-dichloroaniline, and 2,3-dichloroaniline; trihaloanilines such as 2,3,4-trichloroaniline, 2,3,5-trichloroaniline, 2,4,6-trichloroaniline, and 3,4,5-trichloroaniline; dihaloamino diphenyl ethers such as 2,2'-diamino-4,4'-dichloro diphenyl ether, and 2,4'-diamino-2',4-dichloro diphenyl ether; a mixtures thereof; and compounds in which the amino group in the aforementioned compounds is substituted by a thiol group or a hydroxyl group.

An active hydrogen-containing polyhaloaromatic compound in which a hydrogen atom bonded to a carbon atom forming an aromatic ring in the active hydrogen-containing polyhaloaromatic compounds is substituted by another inactive group, for example, a hydrocarbon group such as an alkyl group can also be used.

Among these various active hydrogen-containing polyhaloaromatic compounds, an active hydrogen-containing dihaloaromatic compound is preferable, and dichloroaniline is particularly preferable.

Examples of a polyhaloaromatic compound having a nitro group include mono- or dihalonitrobenzenes such as 2,4-dinitrochlorobenzene, and 2,5-dichloronitrobenzene; dihalonitro diphenyl ethers such as 2-nitro-4,4'-dichloro diphenyl ether; dihalonitrodiphenyl sulfones such as 3,3'-dinitro-4,4'-dichlorodiphenyl sulfone; mono- or dihalonitropyridines such as 2,5-dichloro-3-nitropyridine, and 2-chloro-3,5-dinitropyridine; and various dihalonitronaphthalenes.

The sulfide-forming agent used in the present invention contains an alkali metal sulfide such as lithium sulfide, sodium sulfide, rubidium sulfide, cesium sulfide, or a mixture thereof. Such an alkali metal sulfide can be used in a hydrate, aqueous mixture, or anhydride form. The alkali metal sulfide can be obtained by a reaction of an alkali metal hydrosulfide with an alkali metal hydroxide.

For a reaction of a trace amount of alkali metal hydrosulfide or alkali metal thiosulfate present in the alkali metal sulfide, a small amount of alkali metal hydroxide may be usually added.

Examples of the organic polar solvent used in the present invention include N-methyl-2-pyrrolidone, amides such as formamide, acetamide, N-methylformamide, and N,N-dimethylacetamide, amide ureas such as N-methyl-ε-caprolactam, ε-caprolactam, hexamethyl phosphoramide, tetramethyl urea, N-dimethylpropylene urea, and 1,3-dimethyl-2-imidazolidinone, and lactams; sulfolanes such as sulfolane, and dimethyl sulfolane; nitriles such as benzonitrile; ketones such as methyl phenyl ketone; and a mixture thereof.

As the polymerization condition of the sulfide-forming agent with the polyhaloaromatic compound in the presence of the organic polar solvent, a temperature is generally 200 to 330° C., and a pressure is within such a range that the polymerization solvent and the polyhaloaromatic compound that is a polymerization monomer are substantially held in a liquid phase, and is generally selected from the range of 0.1 to 20 MPa, and preferably 0.1 to 2 MPa. A reaction time varies depending on the temperature and the pressure, and is generally 10 minutes to 72 hours, and desirably 1 hour to 48 hours.

The granular uncrosslinked PAS used in the present invention includes an aspect obtained by a reaction in the presence of the sulfide-forming agent and the organic polar solvent under continuous or intermittent addition of the polyhaloaromatic compound and the organic polar solvent, and an aspect obtained by a reaction in the presence of the polyhaloaromatic compound and the organic polar solvent under continuous or intermittent addition of the sulfide-forming agent.

The granular uncrosslinked PAS used in the present invention can be produced, for example, by post-treatment of the PAS or a reaction mixture including the PAS obtained by the polymerization method.

The post-treatment of the reaction mixture containing the PAS obtained by the polymerization method is not particularly limited. Examples of a step of washing a by-product contained in a polymerization reactant after polymerization of the PAS (an inevitable component derived from the polymerization reaction of the PAS) (hereinafter sometimes simply referred to as "washing step") include the following methods (1) to (6).

(1) A method in which after completion of the polymerization reaction, the solvent is distilled off under reduced pressure or normal pressure from the reaction mixture as it is or after addition of an acid or a base, a solid material after distillation of the solvent is washed with a solvent such as water, the reaction solvent (or an organic solvent having the same solubility in a low molecular weight polymer), acetone, methyl ethyl ketone, and an alcohol, one or two or more times, followed by neutralization, water-washing, and filtration, and if necessary, a dispersion medium is added to obtain a dispersion liquid.

(2) A method in which after completion of the polymerization reaction, a solvent (a solvent that is soluble in the polymerization solvent used and is a poor solvent to at least the PAS) such as water, acetone, methyl ethyl ketone, an alcohol, an ether, a halogenated hydrocarbon, an aromatic hydrocarbon, and an aliphatic hydrocarbon is added as a precipitating agent to the reaction mixture, to precipitate the PAS and a solid product such as an inorganic salt, to wash and filter off them, and if necessary, a dispersion medium is added to obtain a dispersion liquid.

(3) A method in which after completion of the polymerization reaction, a reaction solvent (or an organic solvent having the same solubility in a low molecular weight polymer) is added to the reaction mixture and stirred, and then, the low molecular weight polymer is removed by filtration, the resultant is washed with a solvent such as water, acetone, methyl ethyl ketone, and an alcohol one or two or more times, followed by neutralization, water-washing, and filtration, and if necessary, a dispersion medium is added to obtain a dispersion liquid.

(4) A method in which after completion of the polymerization reaction, water is added to the reaction mixture, followed by water-washing and filtration, and if necessary, an acid is added to treat the reaction mixture with the acid during water-washing, and furthermore, if necessary, a dispersion medium is added to obtain a dispersion liquid.

(5) A method in which after completion of the polymerization reaction, the reaction mixture is filtered, and if necessary, washed one or two or more times with the reaction solvent, followed by water-washing and filtration, and if necessary, a dispersion medium is added to obtain a dispersion liquid.

(6) A method in which after completion of the polymerization reaction, the reaction mixture is desolventized, to obtain a slurry containing the PAS, the slurry containing the PAS is brought into contact with water and an oxygen atom-containing solvent having 1 to 10 carbon atoms to convert the PAS into porous particles, the obtained porous particles are washed with carbonated water and filtered, and if necessary, a dispersion medium is added to obtain a dispersion liquid. Examples of the oxygen atom-containing solvent having 1 to 10 carbon atoms include at least one selected from the group consisting of alcohols and ketones. Examples of the alcohols (also referred to as alcohol-based solvent or alcohol solvent) include alcohols having 10 or less carbon atoms such as methyl alcohol, ethyl alcohol, n-propyl alcohol, isopropyl alcohol, n-butyl alcohol, isobutyl alcohol, t-butyl alcohol, ethylene glycol, propylene glycol, trimethylolpropane, and benzyl alcohol; alcohols having 10 or less carbon atoms and an ether bond such as 2-methoxyethyl alcohol, 2-ethoxyethyl alcohol, 1-methoxy-2-propyl alcohol, 1-ethoxy-2-propyl alcohol, 3-methoxy-1-butyl alcohol, and 2-isopropoxyethyl alcohol; alcohols having 10 or less carbon atoms and a ketone group such as 3-hydroxy-2-butanone; and alcohols having 10 or less carbon atoms and an ester group such as methyl hydroxyisobutyrate. Examples of the ketones (also referred to as ketone-based solvent or ketone solvent) include acetone, methyl ethyl ketone, cyclohexanone, γ-butyl lactone, and N-methyl pyrrolidinone. In the present invention, it is preferable that a monohydric alcohol having 10 or less carbon atoms be used since the remaining carboxylalkylamino group-containing compound can be efficiently removed. Furthermore, a monohydric alcohol having 3 or less carbon atoms is preferable.

After the post-treatments by the methods (1) to (6), the dispersion liquid can be powdered by drying.

The melt viscosity of the uncrosslinked PAS in a powder form used in the present invention is not particularly limited. The melt viscosity (V6) measured at 300° C. is preferably 1 Pa·s or more, more preferably 3 Pa·s or more, and further preferably 5 Pa·s or more, and preferably 800 Pa·s or less, more preferably 500 Pa·s or less, and further preferably 200 Pa·s or less.

The non-Newtonian index of the uncrosslinked PAS in a powder form used in the present invention is not particularly limited. The non-Newtonian index is preferably 0.90 or more, and more preferably 0.95 or more, and preferably 1.25 or less, and more preferably 1.20 or less.

Herein, the melt viscosity (V6) measured at 300° C. represents a melt viscosity after the PAS is held at a temperature of 300° C. under a load of 1.96 MPa for six minutes using an orifice having a ratio of an orifice length to an orifice diameter of 10/1 by a flow tester. The non-Newtonian index (N value) is a value calculated by the following expression from a shear rate and a shear stress that are measured using Capilograph under conditions of 300° C. and a ratio of an orifice length (L) to an orifice diameter (D), L/D, of 40.

$$SR = K \cdot SS^N \qquad \text{[Equation 1]}$$

(where SR represents a shear rate ($s^{-1}$), SS represents a shear stress ($dyne/cm^2$), and K is a constant.) As the N value is closer to 1, the PAS is closer to a linear shape. As the N value is higher, the structure is more crosslinked.

The particle diameter of the uncrosslinked PAS in a powder form used in the present invention is not particularly limited. The average particle diameter obtained by SEM observation is preferably 1 μm or more, more preferably 5 μm or more, and further preferably 20 μm or more, and preferably 500 μm or less, more preferably 400 μm or less, and further preferably 300 μm or less.

The present invention includes the steps of compression-molding the uncrosslinked polyarylene sulfide in a powder form that is thus obtained to obtain a compression-molded material, and measuring the porosity of the compression-molded material.

Examples of compression-molding include a method in which the uncrosslinked PAS in a powder form is mechanically compression-molded in an unmolten state. In the compression-molding step, various methods can be adopted, and the step is not particularly limited. From the viewpoint of stability of production of the compressed material, it is particularly desirable that, specifically, by a method in which the uncrosslinked PAS in a powder form is introduced between two rotatable press rolls configured to be engaged with each other, the uncrosslinked PAS in a powder form be placed between the rolls, transferred, and compressed at high density into a plate shape.

A method for measuring the porosity of the obtained compression-molded material is not particularly limited. For example, a method described in Examples can be used.

The present invention includes the step of grinding the compression-molded material having a specific range of porosity to obtain a pulverized material. That is, the step is a step in which the compression-molded material measured in the preceding step and having a specific range of porosity is selected and ground to obtain the pulverized material.

The specific range of porosity is not particularly limited. For example, from the viewpoint that the amount of fine powder can be reduced, that the crosslinking reaction can be efficiently promoted, and that productivity is excellent, it is sufficient that the compression-molded material having a porosity of preferably 0.10% or more, more preferably 0.30% or more, further preferably 0.50% or more, particularly preferably 0.60 or more, and the most preferably 0.62 or more, and preferably 10.00% or less, more preferably 5.00% or less, and further preferably 4.95% or less is selected.

The step of obtaining the compression-molded material, the step of measuring the porosity, and the step of obtaining the pulverized material can be continuously performed. In this case, the steps can be performed while the porosity of the compression-molded material is adjusted.

The porosity of the compression-molded material can be adjusted by adjusting a compression pressure during compression-molding. In the specific example, the porosity of the plate-shaped compression-molded material can be adjusted by adjusting the distance between the two press rolls.

Specifically, as a method for pulverizing the compression-molded material, various methods can be adopted. The method is not particularly limited. Examples thereof include a method using a roll crusher in which at least two rolls are rotated so as to engage with each other, and the compression-molded material is ground between the rolls mainly by a compression force and partially by a shear force, a method using a cutter mill in which the compression-molded material is ground while a rotor provided with a cutter or the like is rotated, a method using a stamp mill in which the compression-molded material is pulverized by impact caused by dropping a mortar-shaped striking bar, and a method using a stone mortar in which the compression-molded material is ground by a shear force caused when the compression-molded material is passed through a gap between two rubstones, an upper rubstone and a lower rubstone. The shape of the ground material is not particularly limited, and examples thereof include irregularly shaped flakes and chips.

The present invention includes the step of granulating the pulverized material that is thus obtained to obtain a granulated material.

Specifically, as a method for granulating the pulverized material, various methods can be adopted. The method is not particularly limited. Examples thereof include a method for passing the pulverized material through a physical hole to appropriately regulate the size and the shape, such as a sieve, a filter, and a punching metal.

During compression-molding, grinding, and granulating the uncrosslinked PAS in a powder form, a partially crosslinked PAS may be mixed, if necessary.

The porosity of the granulated material thus obtained is the same as the porosity of the compression-molded product before pulverizing.

In the present invention, when the porosity of the compression-molded material of the uncrosslinked PAS for oxidative crosslinking is adjusted as described above, a crosslinked PAS that has a homogeneous gap, a reduced difference among lots, and excellent quality stability is obtained regardless of the particle shape of the granulated material.

From the viewpoint of suitability for oxidative crosslinking and subsequent melting and extrusion molding, the granulated material may have an irregular shape. Examples of the irregular shape may include any shape such as a particle shape, a plate shape, a cylinder, or a needle shape. It is preferable that the irregular shape satisfy a ratio of the shortest distance to the diameter of 0.5 or more when any 20 granulated materials are extracted in a two-dimensional image photographed by electrophotography (magnification: 10 times), the shortest diameter is the shortest size of each of the granulated materials, and the diameter is a diameter corresponding to a circle.

The present invention includes the step of oxidatively crosslinking the granulated material that is thus obtained. Oxidative crosslinking is not particularly limited as long as it is a publicly known method. Examples of the method include a method in which the granulated material is subjected to a heating treatment in an oxidative atmosphere such as air or oxygen rich air. From the viewpoint of improving a time required for the heating treatment and heat-stability during melting of the PAS after the heating treatment, a heating condition is preferably a temperature range of 180° C. or higher and a temperature lower than the melting point of the PAS by 20° C. Herein, the melting point is measured with a differential scanning calorimeter (DSC device Pyris Diamond manufactured by PerkinElmer Co., Ltd.) in accordance with JIS K 7121.

From the viewpoint of increasing the oxidation rate and shortening a treatment time, the oxygen concentration in the heating treatment in an oxidative atmosphere such as air or oxygen rich air is preferably 5% by volume or more, and more preferably 10% by mass or more. From the viewpoint of suppressing an increase in the amount of generated radical, suppressing an increase in tackiness during the heating treatment, and achieving favorable hue, the oxygen concentration may be preferably 30% by volume or less, and more preferably 25% by volume or less.

The non-Newtonian index of the crosslinked PAS used in the present invention that is thus obtained is not particularly limited. For example, the non-Newtonian index may be preferably 1.26 or more, more preferably 1.30 or more, and further preferably 1.35 or more, and preferably 2.00 or less, more preferably 1.95 or less, and further preferably 1.90 or less.

The melt viscosity of the crosslinked PAS in the present invention is not particularly limited. For example, the melt viscosity (V6) measured at 300° C. may be preferably 20 Pa·s or more, and more preferably 100 Pa·s or more, and preferably 5,000 Pa·s or less, and more preferably 2,000 Pa·s or less.

Even when the granulated material of the uncrosslinked PAS is oxidatively crosslinked, the shape thereof is hardly changed. Thus, the porosity, the maximum particle diameter, and the circularity are the same as those described above.

The crosslinked PAS in the present invention as described above can be processed into a molded article having excellent heat resistance, molding workability, and dimensional stability by various melt processing methods such as injection molding, extrusion molding, compression molding, and blow molding.

In order to further improve performances such as strength, heat resistance, and dimensional stability, the crosslinked PAS in the present invention can be used as a PAS resin composition containing various types of fillers. The fillers are not particularly limited, and examples of the fillers include fibrous fillers and inorganic fillers. As the fibrous fillers, natural fibers such as glass fibers, carbon fibers, silane glass fibers, ceramic fibers, aramid fibers, metal fibers, fibers of potassium titanate, silicon carbide, calcium sulfate, or calcium silicate, or wollastonite can be used. As the inorganic fillers, barium sulfate, calcium sulfate, clay, pyrophyllite, bentonite, sericite, zeolite, mica, mica, talc, attapulgite, ferrite, calcium silicate, calcium carbonate, magnesium carbonate, glass beads, or the like, can be used. As an additive for molding processing, various types of additives such as a release agent, a colorant, a heat-resistant stabilizer, an ultraviolet stabilizer, a foaming agent, an anti-rust agent, a flame retarder, and a lubricant can be contained.

The crosslinked PAS obtained by the present invention may be appropriately used, according to application, as a PAS resin composition in which a synthetic resin such as a polyester, a polyamide, a polyimide, a polyetherimide, a polycarbonate, a polyphenylene ether, a polysulfone, a polyether sulfone, a polyether ether ketone, a polyether ketone, a polyarylene, a polyethylene, a polypropylene, a poly(ethylene tetrafluoride), a poly(ethylene difluoride), a polystyrene, an ABS resin, an epoxy resin, a silicone resin, a phenol resin, a urethane resin, or a liquid crystal polymer, or an elastomer such as polyolefin-based rubber, fluororubber, or silicone rubber is mixed.

Since the crosslinked PAS obtained by the method of the present invention includes various performances such as heat resistance and dimensional stability that are originally possessed by a PAS resin, the crosslinked PAS is widely used, for example, for electric and electronic parts such as a connector, a printed circuit board, and a sealing molded article, automobile parts such as a lamp reflector and various electrical components, various architectures, interior materials of an airplane and an automobile, materials for various molding processing, such as materials for injection molding or compression molding such as precision parts including office automation equipment, a camera part, and a watch part, materials for extrusion molding such as a composite, a sheet, and a pipe, and materials for drawing molding, and materials for fibers and films. In particular, the crosslinked PAS resin in the present invention has short crystallization time, is useful in using as a material for injection molding, and improves releasability, and can shorten a molding cycle. Therefore, molding workability and molding efficiency can be improved.

EXAMPLES

Hereinafter, the present invention will be described specifically using Examples. The examples are illustrative and are not limited.

[Synthesis Example] Production of Unclosslinked Polyphenylene Sulfide Resin

In a 150-L autoclave with a stirrer blade equipped with a pressure gauge, a thermometer, a condenser, a decanter, and a rectification tower, 33.222 kg (226 mol) of p-dichlorobenzene (hereinafter, abbreviated as DCB), 2.280 kg (23 mol) of NMP, 27.300 kg (230 mol) of 47.23% by mass sodium hydrosulfide, and 18.533 kg (228 mol) of 49.21% by mass caustic soda were placed. Subsequently, a valve of a pipe from the autoclave to a distillation device was opened to start dehydration, and a valve of a pipe to an evacuator was also opened to decrease a pressure from atmospheric pressure to 47 kPa abs at a rate of −6.6 kPa abs/min. Furthermore, the liquid temperature was gradually heated from 128° C. to 147° C. at a rate of 0.1° C./min. Finally, dehydration was performed at a pressure 47 kPa abs and a liquid temperature of 147° C. for 4 hours. The mixed vapor of water and DCB discharged from the rectification tower was condensed by the condenser, and separated into water and p-DCB by the decanter, water is distilled outside the system, and p-DCB was brought back to the autoclave. The DCB distilled by azeotropy during the dehydration was separated by the decanter, and at any time, was brought back to the autoclave. In the autoclave after completion of the dehydration, an anhydrous sodium sulfide composition was dispersed in DCB. Furthermore, the inner temperature was cooled to 160° C., 47.492 kg (479 mol) of NMP was added, and the inner temperature was heated to 185° C. When the pressure reached 0.00 MPa, a valve connected to the rectification tower was opened, and the inner temperature was heated to 200° C. over one hour. At that time, the outlet temperature of the rectification tower was controlled to be 110° C. or lower by cooling and a valve opening degree. The mixed vapor of distilled DCB and water was condensed by the condenser, and separated by the decanter, and the DCB was brought back to the autoclave. The amount of distilled water was 179 G. Subsequently, the inner temperature was heated from 200° C. to 230° C. over three hours, stirred for one hour, heated to 250° C., and stirred for one hour. After completion of a reaction, the inner temperature of the autoclave was cooled from 250° C. to 235° C. After the inner temperature reached 235° C., a bottom valve of the autoclave was opened, a 150-L vacuum stirring drying device with a stirrer blade (desolvation device jacket temperature: 120° C.) was flushed under reduced pressure to remove N-methyl-2-pyrrolidone, and a content was cooled to room temperature, and sampled. As a result, a PPS mixture containing 55% of N.V., was obtained.

Example/Production Example (Compression Step)

Molding, grinding, and granulating were performed by a roll type compression granulator (roller compactor). Specifically, the PPS mixture obtained in Synthesis Example was placed in a hopper with a screw feeder of the roller compactor, the revolution speed of the screw feeder was adjusted to 63.5 rpm, the roll compression pressure was adjusted to five stages of 1.0, 1.2, 1.5, 1.8, and 2.0 ton/cm, and 30 kg of each plate-shaped compression-molded material was produced at a roll revolution speed of 15 rpm.

(Step of Measuring Porosity)

Next, the porosity of the obtained compression-molded material was measured.

(Grinding Step and Granulating Step)

Subsequently, the amount of each compression-molded material was adjusted to three stages of 848.4, 732.3, and 654.7 kg/hr for treatment, and the compression-molded material was pulverized with a crusher. Thus, 10 kg of pulverized material was obtained.

Next, the pulverized material was granulated with a granulator, and sieved with a screen having an opening (adjusted to 5.0 mm) of the granulator. Thus, each granulated material was obtained.

(Step of Measuring Bulk Specific Gravity)

Subsequently, 10 kg of each of the obtained granulated materials was prepared, and the bulk density thereof was measured.

TABLE 1

| | Porosity % | Bulk density g/cm$^3$ |
|---|---|---|
| Granulated material 1 | 4.94 | 0.482 |
| Granulated material 2 | 4.94 | 0.575 |
| Granulated material 3 | 4.94 | 0.503 |
| Granulated material 4 | 1.52 | 0.485 |
| Granulated material 5 | 1.52 | 0.573 |
| Granulated material 6 | 1.52 | 0.507 |
| Granulated material 7 | 0.62 | 0.488 |
| Granulated material 8 | 0.62 | 0.573 |
| Granulated material 9 | 0.62 | 0.501 |

TABLE 1-continued

| | Porosity % | Bulk density g/cm$^3$ |
|---|---|---|
| Granulated material 10 | 0.35 | 0.498 |
| Granulated material 11 | 0.35 | 0.593 |
| Granulated material 12 | 0.35 | 0.523 |
| Granulated material 13 | 0.10 | 0.509 |
| Granulated material 14 | 0.10 | 0.603 |
| Granulated material 15 | 0.10 | 0.534 |

Example 1

(Oxidative Crosslinking Step)

5 kg of each of the granulated materials 1, 2, and 3 was prepared from the thus obtained granulated materials such that the porosity was constant, then placed in a box type dryer preheated to 150° C., and subjected to a heat treatment while air was sent at 2 L/min. The temperature was controlled such that the inner temperature of a heat treatment device was 250° C. After the granulated materials were held for 0, 2, 4, and 6 hours, the oxidatively crosslinked granulated materials were each obtained. The melt viscosity of each of the oxidatively crosslinked granulated materials was measured. The results are listed in Table 2.

Example 2

Each of oxidatively crosslinked granulated materials was obtained in the same manner as in Example 1 except that “the granulated materials 4, 5, and 6” were used instead of “the granulated materials 1, 2, and 3” in Example 1. The melt viscosity of each of the oxidatively crosslinked granulated materials was measured. The results are listed in Table 2.

Example 3

Each of oxidatively crosslinked granulated materials was obtained in the same manner as in Example 1 except that “the granulated materials 7, 8, and 9” were used instead of “the granulated materials 1, 2, and 3” in Example 1. The melt viscosity of each of the oxidatively crosslinked granulated materials was measured. The results are listed in Table 2.

Example 4

Each of oxidatively crosslinked granulated materials was obtained in the same manner as in Example 1 except that “the granulated materials 10, 11, and 12” were used instead of “the granulated materials 1, 2, and 3” in Example 1. The melt viscosity of each of the oxidatively crosslinked granulated materials was measured. The results are listed in Table 2.

Example 5

Each of oxidatively crosslinked granulated materials was obtained in the same manner as in Example 1 except that “the granulated materials 13, 14, and 15” were used instead of “the granulated materials 1, 2, and 3” in Example 1. The melt viscosity of each of the oxidatively crosslinked granulated materials was measured. The results are listed in Table 2.

TABLE 2

| | | Melt viscosity (Pa S) | | | |
|---|---|---|---|---|---|
| | | 0-Hour heat treatment | 2-Hour heat treatment | 4-Hour heat treatment | 6-Hour heat treatment |
| Example 1 | Granulated material 1 | 41.38 | 94.21 | 120.3 | 150.9 |
| | Granulated material 2 | 42.91 | 92.35 | 119.8 | 149.9 |
| | Granulated material 3 | 41.88 | 96.42 | 121.4 | 151.9 |
| Example 2 | Granulated material 4 | 40.01 | 90.24 | 115.5 | 147.4 |
| | Granulated material 5 | 41.55 | 90.23 | 114.9 | 146.2 |
| | Granulated material 6 | 41.79 | 91.02 | 116.5 | 147.8 |
| Example 3 | Granulated material 7 | 41.09 | 87.43 | 113.5 | 141.1 |
| | Granulated material 8 | 42.47 | 86.09 | 112.4 | 140.3 |
| | Granulated material 9 | 40.22 | 89.01 | 115.1 | 142.8 |
| Example 4 | Granulated material 10 | 42.49 | 85.69 | 109.5 | 137.7 |
| | Granulated material 11 | 43.78 | 86.24 | 107.5 | 136.8 |
| | Granulated material 12 | 40.96 | 84.24 | 108.7 | 136.4 |
| Example 5 | Granulated material 13 | 39.98 | 62.21 | 87.4 | 100.3 |
| | Granulated material 14 | 38.44 | 61.78 | 90.7 | 102.6 |
| | Granulated material 15 | 38.83 | 63.51 | 89.9 | 100.9 |

Comparative Example 1

(Oxidative Crosslinking Step)

5 kg of each of the granulated materials 1, 4, and 7 was prepared from the thus obtained granulated materials such that the bulk density was constant, then placed in a box type dryer preheated to 150° C., and subjected to a heat treatment while air was sent at 2 L/min. The temperature was controlled such that the inner temperature of a heat treatment device was 250° C. After the granulated materials were held for 0, 2, 4, and 6 hours, the oxidatively crosslinked granulated materials were each obtained. The melt viscosity of each of the oxidatively crosslinked granulated materials was measured. The results are listed in Table 3.

Comparative Example 2

Each of oxidatively crosslinked granulated materials was obtained in the same manner as in Example 1 except that “the granulated materials 2, 5, and 8” were used instead of “the granulated materials 1, 4, and 7” in Comparative Example 1. The melt viscosity of each of the oxidatively crosslinked granulated materials was measured. The results are listed in Table 3.

Comparative Example 3

Each of oxidatively crosslinked granulated materials was obtained in the same manner as in Example 1 except that “the granulated materials 3, 6, and 9” were used instead of “the granulated materials 1, 4, and 7” in Comparative Example 1. The melt viscosity of each of the oxidatively crosslinked granulated materials was measured. The results are listed in Table 3.

TABLE 3

| | | Melt viscosity (Pa S) | | | |
|---|---|---|---|---|---|
| | | 0-Hour heat treat-ment | 2-Hour heat treat-ment | 4-Hour heat treat-ment | 6-Hour heat treat-ment |
| Comparative Example 1 | Granulated material 1 | 41.24 | 94.53 | 120.7 | 150.5 |
| | Granulated material 4 | 40.34 | 90.82 | 115.3 | 147.7 |
| | Granulated material 7 | 41.21 | 87.19 | 113.4 | 141.3 |
| Comparative Example 2 | Granulated material 2 | 42.93 | 92.27 | 119.6 | 149.4 |
| | Granulated material 5 | 41.73 | 90.43 | 114.6 | 146.3 |
| | Granulated material 8 | 42.27 | 86.46 | 112.3 | 140.5 |
| Comparative Example 3 | Granulated material 3 | 41.90 | 96.58 | 121.7 | 151.6 |
| | Granulated material 6 | 41.61 | 91.55 | 116.7 | 147.6 |
| | Granulated material 9 | 40.45 | 89.67 | 115.3 | 142.9 |

As clear from the results, a crosslinked PPS having a reduced difference in melt viscosity is more likely to be obtained from the plate-shaped compression-molded material having a constant porosity than the granulated material having a constant bulk density regardless of the heat treatment time. Therefore, it is clear that a progression state of a crosslinking reaction and the melt viscosity can be more accurately controlled than the bulk specific gravity that varies depending on the particle diameter of the granulated material and the ratio of gaps between the granulated materials.

As clear from the results, a crosslinked PPS having a reduced difference in melt viscosity and high melt viscosity is also likely to be obtained when the porosity of the plate-shaped compression-molded material is within the range of 0.10 to 4.94. Furthermore, when the porosity of the plate-shaped compression-molded material is within the range of 0.62 to 4.94, the crosslinking reaction can be efficiently promoted, and the melt viscosity can be increased in a short time.

Each of measurements was performed as follows.

(Measurement Example) Measurement of Porosity

For the porosity (%) of a compression-molded material, a plate-shaped compression-molded material was used, and the ratio of the volume of pore contained in a constant volume of the plate-shaped compression-molded material was measured as the porosity (%) by the following X-ray CT scanning method.

(X-ray CT Scanning Method)

CT Scanning Condition

X-ray CT scanning: "TDM1000H-II (2K)" manufactured by Yamato Scientific Co., Ltd., was used.

The porosity was analyzed as a binary-coding threshold value using as current conditions a 2-inch scanner, an extension axis position of 15 mm, a tube voltage of 50 kV, and a tube current of 0.085 mA, and as pore scanning conditions a matrix size of 512×512×512 pixels, a constituent visual field size of 1.08 mm×1.08 mm×1.08 mm, and a reconstruction picture element size of 0.002123 mm in three dimensions. The average of 10 porosities is listed in Table.

(Measurement Example) Measurement of Bulk Density

A container having a constant volume was filled with the granulated material so as to level the surface of the granulated material, and a lid was put. The weight of the granulated material was measured with an electronic meter, and then divided by the volume to calculate a bulk density (g/cm3).

(Measurement Example) Measurement of Melt Viscosity

The oxidatively crosslinked granulated material PPS was held under conditions including a temperature of 300° C., a load of $1.96\times10^{6}$ Pa, and L/D=10 (mm)/1 (mm) for 6 minutes, and the melt viscosity at 300° C. was measured with a flow tester CFT-500D (manufactured by Shimadzu Corporation).

The invention claimed is:

1. A method for producing a crosslinked polyarylene sulfide, the method comprising steps of:
- compression-molding an uncrosslinked polyarylene sulfide in a powder form to obtain a compression-molded material;
- measuring a porosity of the compression-molded material, wherein the porosity is a ratio of a volume of pores to a total volume of the compression-molded material as measured by an X-ray CT scanning method;
- selecting the compression-molded material having a porosity within a range of 0.10% to 10.00%;
- grinding the selected compression-molded material having the specific range of porosity to obtain a pulverized material;
- granulating the pulverized material to obtain a granulated material; and
- oxidatively crosslinking the granulated material obtained in the preceding step.

2. The method for producing a crosslinked polyarylene sulfide according to claim 1, wherein the granulated material has an irregular shape.

3. The method for producing a crosslinked polyarylene sulfide according to claim 1, wherein the specific range of porosity is within a range of 0.10% to 5.00%.

4. A method for producing a resin composition, the method comprising steps of:
- producing a crosslinked polyarylene sulfide produced by the method according to claim 1; and
- melt-kneading the obtained crosslinked polyarylene sulfide with another component.

5. A method for producing a molded article, the method comprising steps of:
- producing a resin composition by the method according to claim 4; and
- melt-molding the obtained resin composition.

6. The method for producing a crosslinked polyarylene sulfide according to claim 2, wherein the specific range of porosity is within a range of 0.10% to 5.00%.

7. A method for producing a resin composition, the method comprising steps of:
- producing a crosslinked polyarylene sulfide produced by the method according to claim 2; and
- melt-kneading the obtained crosslinked polyarylene sulfide with another component.

8. A method for producing a resin composition, the method comprising steps of:
- producing a crosslinked polyarylene sulfide produced by the method according to claim 3; and
- melt-kneading the obtained crosslinked polyarylene sulfide with another component.

9. A method for producing a resin composition, the method comprising steps of:
- producing a crosslinked polyarylene sulfide produced by the method according to claim 6; and melt-kneading the obtained crosslinked polyarylene sulfide with another component.

10. A method for producing a molded article, the method comprising steps of:

producing a resin composition by the method according to claim 7; and melt-molding the obtained resin composition.

11. A method for producing a molded article, the method comprising steps of:

producing a resin composition by the method according to claim 8; and melt-molding the obtained resin composition.

12. A method for producing a molded article, the method comprising steps of:

producing a resin composition by the method according to claim 9; and melt-molding the obtained resin composition.

13. The method for producing a crosslinked polyarylene sulfide according to claim 1, wherein the specific range of porosity is within a range of 0.10% to 4.94%.

14. The method for producing a crosslinked polyarylene sulfide according to claim 1, wherein the specific range of porosity is within a range of 0.62% to 4.94%.

15. The method for producing a crosslinked polyarylene sulfide according to claim 1, wherein the compression-molded material is plate-shaped.

* * * * *